United States Patent [19]

Schmidt et al.

[11] Patent Number: 4,733,005

[45] Date of Patent: Mar. 22, 1988

[54] PHOSPHINYL-CONTAINING ETHYLENICALLY UNSATURATED COMPOUNDS

[75] Inventors: Donald L. Schmidt; Gerald K. McEwen, both of Midland, Mich.

[73] Assignee: The Dow Chemical Company, Midland, Mich.

[21] Appl. No.: 936,685

[22] Filed: Dec. 1, 1986

Related U.S. Application Data

[62] Division of Ser. No. 854,275, Apr. 21, 1986, Pat. No. 4,658,003.

[51] Int. Cl.$^4$ ................................................ C07F 9/32
[52] U.S. Cl. ..................................................... 560/222
[58] Field of Search .................. 560/222; 260/502.4 R

[56] References Cited

PUBLICATIONS

Borisov, G. et al., *Chemical Abstracts*, vol. 69, (1968), #27,946z.

*Primary Examiner*—Donald B. Moyer
*Assistant Examiner*—L. Hendriksen

[57] ABSTRACT

The invention is (hydroxy)-phosphinylalkyl acrylate, (hydroxy)-phosphinylalkyl methacrylate or an alkali metal, alkaline earth metal or ammonium salt thereof.

In another aspect, the invention is a polymeric composition which comprises the reaction product of:
 (a) between about 0.5 and 100 percent by weight of a (hydroxy)-phosphinylalkyl acrylate, (hydroxy)-phosphinylalkyl methacrylate or an alkali metal, alkaline earth metal or ammonium salt thereof; and
 (b) between about 0 and 99.5 weight percent of a compound containing a polymerizable 1,2-ethylenically unsaturated moiety.

6 Claims, No Drawings

PHOSPHINYL-CONTAINING ETHYLENICALLY UNSATURATED COMPOUNDS

CROSS-REFERENCE TO RELATED APPLICATION

This is a divisional of application Ser. No. 854,275, filed Apr. 21, 1986, now U.S. Pat. No. 4,658,003.

BACKGROUND OF INVENTION

This invention relates to novel 1,2-ethylenically unsaturated (hydroxy)-phosphinyl-containing compounds, and polymers containing such compounds.

The novel 1,2-ethylenically unsaturated (hydroxy)-phosphinyl-containing compounds of this invention are useful in preparing polymeric compositions when copolymerized with compounds containing polymerizable 1,2-ethylenically unsaturated moieties, or homopolymerized. The polymeric compositions prepared are useful in latex paints, in plastic-metal laminates, coatings for metals, and in adhesives. Polymeric compositions prepared from compounds containing 1,2-ethylenically unsaturated moieties are often contacted or applied to metals in various ways.

A major problem is to find a polymeric composition which has good adherence to particular metals. What is needed is a polymeric composition prepared from compounds containing 1,2-ethylenically unsaturated moieties which have good adherent properties to metal, and other substrates.

SUMMARY OF INVENTION

The invention is (hydroxy)-phosphinylalkyl acrylate, (hydroxy)-phosphinylalkyl methacrylate or an alkali metal, alkaline earth metal or ammonium salt thereof.

In another aspect the invention is a polymeric composition which comprises the reaction product of:
(a) between about 0.5 and 100 percent by weight of a (hydroxy)-phosphinylalkyl acrylate, (hydroxy)-phosphinylalkyl methacrylate or an alkali metal, alkaline earth metal or ammonium salt thereof; and
(b) between about 0 and 99.5 weight percent of a compound containing a polymerizable 1,2-ethylenically unsaturated moiety.

The polymeric compositions prepared from the 1,2-ethylenically unsaturated (hydroxy)-phosphinyl-containing compound of this invention, have surprisingly good adherence to many metals. Furthermore, the polymeric compositions have enhanced anticorrosive properties.

DETAILED DESCRIPTION

The novel compounds of this invention preferably correspond to the formula:

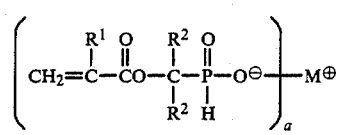

or

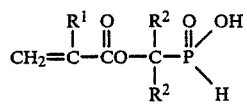

wherein:
$R^1$ is hydrogen or methyl;
$R^2$ is separately in each occurrence hydrogen or $C_{1-10}$ alkyl;
M is an alkali metal, alkaline earth metal or ammonium; and
a is 1 or 2.

In the embodiment wherein M is an ammonium moiety or an alkali metal, a is 1. In the embodiment wherein M is an alkaline earth metal, a is 2.

In the above formula, $R^2$ is preferably hydrogen or $C_{1-3}$ alkyl, more preferably hydrogen or methyl, and most preferably hydrogen. $R^1$ is most preferably methyl. M is preferably an ammonium moiety or an alkali metal. M is more preferably an ammonium moiety, potassium or sodium. Preferably, a is 1.

The novel compounds of this invention are generally clear viscous liquids which are soluble in water and polar organic solvents such as methanol and dimethylsulfoxide.

The (hydroxy)-phosphinylalkyl acrylates and (hydroxy)-phosphinylalkyl methacrylates can be prepared by the reaction of hypophosphorous acid with a suitable aldehyde or ketone to prepare an α-hydroxyalkylphosphorous acid, which is thereafter reacted with acrylic or methacrylic acid to prepare the novel compounds. This reaction sequence is exemplified by equations I and II.

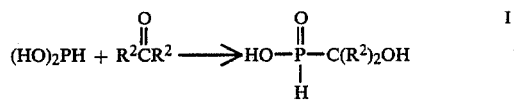

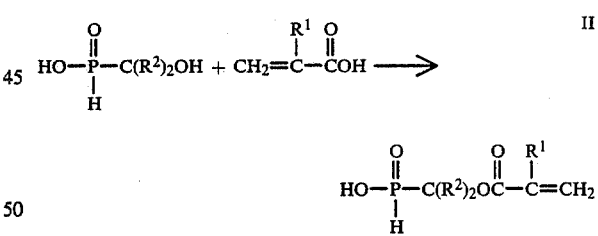

wherein $R^1$ and $R^2$ are as defined hereinbefore.

In the first step of this process, the hypophosphorous acid is contacted with a suitable aldehyde or ketone in a ratio of between about 3:1 and 1:1. In this reaction there cannot be an excess of aldehyde or ketone as such as excess would result in multiple additions of aldehyde or ketone to the acid. This process is done in an aqueous solution. It is preferable to add the aldehyde or ketone to an aqueous solution of the hypophosphorous acid, as this reaction is exothermic and slow addition results in much better control of the reaction temperature.

Generally, this step can be run at any temperature at which the reaction proceeds. Preferable temperatures are between about 20° C. and 100° C., with temperatures between about 70° C. and 90° C. being most preferred.

This process may be run at any pressure at which the reaction occurs. Atmospheric, subatmospheric and superatmospheric pressures may be used. Atmospheric pressure is preferred. Although not necessary, it is advantageous to run this reaction under an inert gas atmosphere. Examples of inert gases include nitrogen, argon and the like.

Any reaction time which gives the desired conversion is suitable. Generally, reaction times of between about three and ten hours are preferable. Upon completion of the reaction, the water solvent is stripped off.

The hydroxyalkylphosphorous acid prepared in the above-described reaction is then contacted with methacrylic acid or acrylic acid in a ratio of between about 3:1 and 1:3, with a ratio of between about 2:1 and 1:2 being preferred, and with a ratio of about 1:1 being most preferred. Where there is an excess of one reagent, it is preferable that that reagent be methacrylic or acrylic acid. This process is generally run in an inert organic solvent, examples of preferred inert organic solvents are aromatic hydrocarbons and chlorinated solvents. Among more preferred solvents are perchloroethylene and xylene. It is preferred that the solvent used have a boiling point over 100° C., and most preferred that the solvent have a boiling point over 120° C.

This reaction is done in the presence of an esterification catalyst. Preferred esterification catalysts are strong acids. More preferred strong acids include sulfonic acids, sulfuric acids and phosphoric acid. A most preferred catalyst is p-toluene sulfonic acid.

Any temperature at which the reaction proceeds is suitable. This reaction is preferably done at the reflux temperature of the solvent. It is more preferable that the reflux temperature be over 100° C., with a reflux temperature of over 120° C. being most preferred.

During the course of this process water is formed as a by-product. It is preferred to remove the water as formed, as the process is an equilibrium process and the removal of water drives the reaction to completion.

This reaction may be run at atmospheric and superatmospheric pressures. Atmospheric pressure is preferred. An inert atmosphere can be used.

Reaction times which give the desired conversion are suitable. Preferable reaction times are between four and ten hours.

The salts of the (hydroxy)-phosphinylalkyl acrylate or (hydroxy)-phosphinylalkyl methacrylate are prepared by contacting the (hydroxy)-phosphinylalkyl acrylate or (hydroxy)-phosphinylalkyl methacrylate with a base which contains an alkali metal, alkaline earth metal or an ammonium moiety in water under conditions such that the salts are formed. Conditions for such reactions are well-known to those skilled in the art. Examples of preferable bases include ammonium hydroxides, alkali metal hydroxides, alkali metal carbonates, alkaline earth metal hydroxides and alkaline earth metal carbonates.

Alkali metal refers herein to lithium, sodium, potassium, rubidium and cesium. Preferred alkali metals are lithium, potassium and sodium, with potassium and sodium being most preferred. Alkaline earth metal refers herein to beryllium, magnesium, calcium, strontium and barium. Preferred alkaline earth metals are magnesium and calcium.

The polymeric compositions of this invention comprise the reaction product of a (hydroxy)-phosphinylalkyl acrylate, (hydroxy)-phosphinylalkyl methacrylate or an alkali metal, alkaline earth metal or ammonium salt thereof, and a compound containing a polymerizable 1,2-ethylenically unsaturated moiety. The polymeric compositions of this invention preferably contain between about 1 and 10 weight percent of the novel phosphinyl-substituted 1,2-ethylenically unsaturated compounds of this invention, and more preferably between about 1 and 5 percent of the phosphinyl-substituted 1,2-ethylenically unsaturated compounds.

In another aspect of this invention, the polymeric compositions comprise the reaction product of
(a) between about 0.5 and 99 percent by weight of a (hydroxy)-phosphinylalkyl acrylate, (hydroxy)-phosphinylalkyl methacrylate or an alkali metal, alkaline earth metal or an ammonium salt thereof; and
(b) between about 1 and 99.5 percent of two or more compounds which contain a polymerizable 1,2-ethylenically unsaturated moiety.

Any compound which contains a polymerizable 1,2-ethylenically unsaturated moiety is useful in this invention. Examples of such compounds include monovinyl aromatics, such as styrene, p-vinyl toluene, p-chlorostyrene; $\alpha,\beta$-ethylenically unsaturated acids, such as acrylic acid and methylacrylic acid; alkyl esters of $\alpha,\beta$-ethylenically unsaturated monocarboxylic acids, containing from 1 to 18 carbon atoms in the alkyl group, such as methyl acrylate, ethyl acrylate, 2-ethylhexyl acrylate and methyl methacrylate; $\alpha,\beta$-ethylenically unsaturated nitriles such as acrylonitrile and methacrylonitrile; $\alpha,\beta$-ethylenically unsaturated amides, such as acrylamide and methacrylamide; vinyl esters, such as vinyl acetate and vinyl propionate; vinyl halides, such as vinyl chloride and vinyl bromide; vinyl ethers, such as vinyl methyl ether and vinyl ethyl ether; vinyl ketones, such as vinyl methyl ketone and vinyl ethyl ketone; vinylidene halides, such as vinylidene chloride and vinylidene bromide; hydroxyalkyl esters of acrylic and methacrylic acids such as hydroxypropyl acrylate, hydroxyethyl acrylate, and hydroxybutyl acrylate; nitriles of ethylenically unsaturated carboxylic acids such as acrylonitrile and methacrylonitrile; ethylenically unsaturated carboxylic acids such as acrylic acid; ethylenically unsaturated alcohols such as allyl alcohol; aromatic compounds substituted with 1,2-ethylenically unsaturated moieties such as, styrene, vinyl toluene, tert-butylstyrene and the like.

The polymeric compositions of this invention are prepared by methods well-known in the art, and such preparations are not the point of this invention. Suitable polymerization techniques include solution polymerization, dispersion polymerization, emulsion polymerization, bulk polymerization, and heterogeneous polymerization. These polymerizations can be done in continuous or batchwise manner where appropriate.

In one embodiment, the polymeric compositions of this invention can be prepared by free radical initiated solution polymerization. In particular, the phosphinyl-substituted 1,2-ethylenically unsaturated monomers are homopolymerized, or copolymerized with one or more compounds which contain a polymerizable 1,2-ethylenically unsaturated moiety, in an organic solvent medium in the presence of a free radical type catalyst under an oxygen-free atmosphere. The monomeric constituents are mixed and polymerized in the proportions set out hereinbefore.

Exemplary solvents include the lower alkanols such as ethanol, propanol, and butanol; aromatic hydrocarbons such as toluene, benzene and xylene; halohydrocarbons such as methylene chloride, tetrachloroethane and the like; and others such as butyl acetate and butoxyethyl acetate.

Representative catalysts employed in free-radical catalyzed polymerizations include azo and peroxide-types; e.g., peroxides such as benzoyl peroxide, hydroperoxides such as t-butyl hydroperoxide; per-acids such as perbenzoic acid; peresters, such as t-butyl peroctoate; and azo compounds such as azobisisobutyronitrile. Free radical catalyzed polymerization is readily effected at temperatures of from about room temperature (about 20° C.) to about 200° C. under atmospheric to superatmospheric pressure at catalyst concentrations of 0 in the case of thermal initiation to about 5 weight percent based on weight of monomers, preferably from about 0.01 to about 5 weight percent of catalyst in pure form or in an inert solvent for the catalyst. Thermal initiation generally occurs at temperatures between 60° C.-120° C.

Often, it may be necessary to employ a chain regulator in order to provide a molecular weight in the range desired. Examples of chain regulators that may be employed include long chained alkyl mercaptans, e.g., t-dodecyl mercaptan of the formula:

$H_3CC(CH_3)_2CH_2C(CH_3)_2CH_2C(CH_3)_2SH$ short chained alkyl mercaptans such as butyl mercaptan and 2-hydroxyethyl mercaptan, isopropanol, isobutanol, long chained alcohols, e.g., lauryl alcohol, octyl alcohol, cumene, carbon tetrachloride, tetrachloroethylene, and trichlorobromomethane. The amount of chain regulator that may be employed depends on the particular system and the conditions and may vary from 0 to about 5 weight percent based on monomer weight. Illustratively, the use of from 0 to about 1 weight percent of t-dodecyl mercaptan serves to provide as wide a range of molecular weight in aqueous media as is desirable.

In another embodiment, the polymeric compositions of this invention can be prepared by ionic polymerization techniques.

Representative ionic catalysts include lithium based catalysts, e.g., metallic lithium, alkyl lithium and other lithium compounds, and Ziegler catalysts, e.g., reducible halide of titanium or vanadium in combination with aluminum trialkyl, or diethylaluminum chloride, or lithium aluminum hydride. Ionic polymerization is advantageously carried out in an inert hydrocarbon solvent such as lower alkane or lower aromatic hydrocarbon at temperatures in the order of about −20° C. to about 140° C. under pressures ranging from atmospheric to superatmospheric and in the presence of from about 1 to 200 ppm of ionic catalyst based on weight of monomers. Polymerization can be similarly effected by cationic catalysts at temperatures from −100° C. to 100° C. Such catalysts include the etherates of boron trifluoride and aluminum trichloride and Ziegler catalysts such as the reaction product of reducible transition metal compounds such as titanium tetrachloride or trichloride and reducing organo metallic compounds such as triethyl aluminum or diethylaluminum chloride.

In another embodiment, low pressure polymerization techniques can be used wherein the compounds containing the polymerizable 1,2-ethylenically unsaturated moieties are alpha-olefins.

The low pressure polymerization of alpha-olefins with catalyst systems composed of a partially reduced, heavy transition metal component and organometallic reducing component to form high density, high molecular weight, solid, relatively linear polymers is well-known. Characteristically, such polymerizations are carried out in an inert organic liquid diluent under an inert atmosphere and at relatively low temperatures, e.g., 0° C. to 100° C., and low pressures, e.g., 0 to 100 psig. Typical transition metal components are the halides, oxyhalides, alkoxides and the like of metals selected from Groups IVB, VB, VIB and VIII of the Periodic Table of Elements appearing in the Handbook of Chemistry and Physics, 48th ed., Chemical Rubber Company. Common organometallic components include the metal alkyls, metal alkyl halides and dihalides, metal hydrides and similar compounds in which the metals are selected from Groups IA, IIA and IIIA of the Periodic Table of Elements. The alpha-olefin polymers produced by low pressure polymerization generally have molecular weights in the range of about 100,000 to 300,000 or even as high as 3,000,000.

In yet another embodiment the polymeric composition of this invention can be prepared by emulsion polymerization wherein the monomers are dispersed in an aqueous medium containing a free radical type catalyst and a stabilizing emulsifier or mixture of emulsifiers. Suitable free radical catalysts include the persulfates (including ammonium, sodium and potassium persulfate), hydrogen peroxide, the perborates, and the percarbonates. Organic peroxides may also be used either alone or in addition to an inorganic peroxygen compound. Typical organic peroxides include benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide and the like. The usual amount of catalyst required is roughly from about 0.01 to about 3.0 weight percent, based on the monomer mix. In order to enhance rate of polymerization, improve polymer properties, and to reduce undesirable side reactions, it is often desirable to activate the catalyst. Activation of the catalyst also has the effect of lowering the temperature required to polymerize the monomers. The activation may be best accomplished by using a redox system in which a reducing agent within the limits of about 0.001 to about 6.0 weight percent based on the monomers is present in addition to the peroxide catalyst. Many examples of such redox systems are known. Agents such as hydrazine or a soluble oxidizable sulfoxy compound, including the alkali metal salts of hydrosulfites, sulfoxlates, thiosulfates, sulfites and bisulfites and the like can be employed. Redox systems may be activated by the presence of a small amount (a few parts per million) of polyvalent metal ions. Ferrous ions are commonly and effectively used, or a tertiary amine which is soluble in the reaction medium may also be used as an activator.

Stabilizing emulsifiers suited for the purposes of this invention include the anionic and nonionic surfactants. Examples of suitable anionic surfactants include the alkyl aryl sulfonates, the alkali metal alkyl sulfates, the sulfonated alkyl esters, the fatty acid soaps, and the like. Specific examples of these well-known emulsifers, for the purpose of illustration and not for limitation, are sodium butylnaphthalene sulfonate, sodium lauryl sulfate, disodium dodecyldiphenyl ether disulfonate, N-octadecyl sodium sulfosuccinamate, dihexyl sodium sulfosuccinate and dioctyl sodium sulfosuccinate. A preferred anionic surfactant is disodium dodecyldiphenyl ether disulfonate.

Suitable nonionic surfactants include the polyethenoxy agents, e.g., ethylene glycol polyethers, ethylene nonylphenol polyethers, and the like; fatty acid esters of polyhydric alcohols, e.g., propylene glycol fatty acid ester; and the like. Other suitable nonionic emulsifiers are described in Becher, Emulsions: Theory and Practice, 2d. ed., Reinhold Publishing Corporation, New York, 221–225 (1965). A preferred nonionic emulsifier is ethylene nonylphenol polyether having 40 moles of ethylene oxide per mole of nonylphenol.

The amounts of surfactants required depend primarily on the concentrations of monomers to be handled and, to a further extent, with the choice of kind of surfactants, monomers, and proportions of monomers. Generally, the amount of emulsifying agent required falls between about 0.5 and about 10 weight percent of the mixture of monomers. A preferable emulsifier system for preparing the latexes of this invention is a mixture of from about 0.1 part to about 0.5 part of an anionic surfactant and from about 4 parts to about 5 parts of a nonionic surfactant per 100 parts monomer used in the preparation of the latex. Latexes which do not have a measurable amount of coagulum are readily obtained when the amount is from about 0.2 to about 0.3 part of anionic surfactant and from about 4.0 parts to about 4.2 parts of nonionic surfactant per 100 parts of monomer.

Polymerization of the monomers is suitably carried out at temperatures between about room temperature and about 100° C., preferably between about 65° C. and about 80° C. As mentioned previously the use of catalyst activators lowers the required temperature of polymerization. During polymerization, the temperature may be controlled in part by the rate at which the monomers are supplied and polymerized and/or by applied cooling.

As taught in the art, emulsion polymerization may be performed batchwise or continuously. It is possible to work entirely batchwise, emulsifying the entire charge of monomers and proceeding with polymerization. It is usually advantageous, however, to start with part of the monomers which are to be used and add the remainder of the monomer or monomers as polymerization proceeds. An advantage of gradual monomer addition lies in reaching a high solids content with optimum control and with maximum uniformity of product.

In yet another embodiment heterogeneous polymerization techniques may be used to prepare the polymeric compositions of this invention. Heterogeneous catalysts are readily obtained by mixing an alkyl aluminum with a reducible compound of a metal of Groups IVA, VA, VIA and VIII of the Periodic Chart. Examples of alkyl aluminum compounds which may be used include trimethyl aluminum, triethyl aluminum, triisobutyl aluminum, tri-n-butyl aluminum, tri-n-pentyl aluminum, diethyl aluminum chloride, diethyl aluminum hydride and the like. Metals of the above-listed groups include titanium, zirconium, hafnium, thorium, uranium, vanadium, niobium, tantalum, chromium, molybdenum, tungsten and iron. Examples of suitable reducible compounds of these metals include halides, e.g., chlorides and bromides; oxyhalides, e.g., oxychlorides; complex halides, e.g., complex fluorides; freshly precipitated oxides or hydroxides; and organic compounds, e.g., alcoholates, acetates, benzoates, or acetyl acetonates. Titanium compounds are preferred, for example, titanium tetrachloride, titanium oxychloride or titanium acetyl acetonate. An especially preferred heterogeneous catalyst is a mixture of triisobutyl aluminum and titanium tetrachloride. Such catalyst systems are prepared by dissolving each of the catalyst components in an inert liquid vehicle such as hexane under an oxygen- and moisture-free atmosphere, e.g., nitrogen, argon, helium and the like. Actual procedures for preparing these catalyst systems are described in more detail in U.S. Pat. Nos. 3,113,115 and 3,257,332 of Karl Ziegler et al. (incorporated herein by reference).

The heterogeneous catalyst process is carried out in the absence of molecular oxygen, carbon monoxide, carbon dioxide and water in a conventional reaction vessel which permits bubbling of the monomers through the inert vehicle which contains the catalyst. The polymerization is conducted at temperatures in the range of between about 30° C. and 100° C. and preferably between about 85° C. and 95° C. For convenience of handling the gaseous alpha-olefins, the polymerization zone is maintained under a pressure between about atmospheric and 115 pounds per square inch gauge (psig) for the first stage, preferably at a pressure in the range of between about 55 and 65 psig. In a preferred embodiment, the first stage is carried out in the presence of a molecular weight polymerization control agent such as hydrogen, acetylene, and other commonly employed chain transfer agents. If hydrogen is used as the molecular weight control agent, the amount of hydrogen employed ranges from about 1 to about 90 mole percent based on the monomer feed, and preferably from about 25 to about 50 mole percent. However, it is preferred that the molecular weight control agent not be present during polymerization of the second stage.

The polymerization process may be carried out in a batchwise or continuous manner.

Upon completion of polymerization, any excess monomer is vented. The mixture is then treated by any conventional method to deactivate the catalyst and remove the catalyst residues and recover the polymer mixture. In one method, deactivation of the catalyst is accomplished by washing the slurry mixture with an alcohol such as methanol, n-propanol, isopropanol and the like. The polymer is then separated from the diluent, e.g., by decantation, filtration or other similar method, after which the polymer is dried.

In yet another embodiment, the polymeric composition of this invention may be prepared by bulk polymerization, wherein the monomeric components are directly contacted in the presence of a catalyst. In bulk polymerizations free radical catalysts may be used, such free radical catalysts are described hereinbefore. Polymerization catalyst concentrations are generally between 0.001 and 5 weight percent. Temperatures are between room temperature (about 20° C.) and 200° C. Atmospheric and superatmospheric pressures may be used. Due to problems in the dissipation of heat in exothermic bulk polymerizations, bulk polymerization may either be terminated at relatively low conversions of between about 40 and 60 weight percent and excess monomer distilled off, or the polymerization may be carried out in two steps. In the first step, a large batch of monomer is polymerized to an intermediate conversion and then, for ease of heat dissipation, the polymerization is completed in thin layers. The reaction may be carried to completion while the monomer-polymer mixture flows either through a small diameter tube or down the walls of a column or by free fall in thin streams.

In yet another embodiment, the polymeric compositions of this invention may be prepared by suspension polymerization techniques. In suspension polymerization, the catalyst is dissolved in the monomer, the monomer is dispersed in water, and a dispersing agent is incorporated to stabilize the suspension formed. Suspending agents are generally water-soluble organic polymers, such as poly(vinylalcohol), poly(acrylic acid), methyl cellulose, gelatin and various pectins; and water insoluble inorganic compounds such as kaolin, magnesium silicates, aluminum hydroxide, and various phosphates. Free radical catalysts described hereinbefore are useful for these suspension polymerizations. Generally, catalyst concentrations of between about 0.001 and 5 weight percent based on the monomer are used. Temperatures of between room temperature (about 20° C.) and about 200° C. are suitable. The polymers prepared are in the form of finely granulated beads which are easily recovered by filtration and dried.

The choice of the particular polymerization process to be used depends upon the particular monomer system used and the desired properties of the polymeric composition. Those skilled in the art can well make such choices.

The polymeric compositions of this invention have increased adhesion to metals and anticorrosive properties. These polymeric compositions are useful in latex paints, coatings for metals, plastic-metal laminates, adhesives, and the like.

SPECIFIC EMBODIMENTS

These examples are provided for illustrative purposes only, and are not intended to limit the scope of the invention or the claims. All part and percentages are by weight unless otherwise specified.

Example 1

A-Preparation of Hydroxymethylphosphorous Acid

In a 500-ml, 3-neck flask, fitted with a magnetic stirrer, thermometer, nitrogen inlet and condenser, is placed 264 g of 50 percent hypophosphorous acid. The solution is heated to 80° C. while stirring. Paraformaldehyde (66 g) is then added portionwise (~2½ g portions) over a period of about 30 minutes. After addition is complete, the solution is held at 80° C. for 3 hours. An additional 4 g of paraformaldehyde is added and heating is continued for 3 more hours. The clear solution is then stripped of water on a rotary evaporator, 100 ml of absolute ethanol added, then stripped again. This yielded a clear liquid which is characterized by $^{13}C$ and $^{31}P$ nuclear magnetic resonance.

[$\delta$ $^{31}P$ = 30.0 ppm; $J_{PH}$ = 549 Hz]

B-Preparation of (Hydroxy)phosphinylmethyl Methacrylate

A 2-liter, 3-neck flask, fitted with a mechanical stirrer, nitrogen sparge, and a modified Dean Stark trap and condenser is charged with the following reactants:
96.0 grams (1 mole) hydroxymethylphosphorous acid
258 grams (3 mole) methacrylic acid
0.4 grams phenothiazine
0.8 grams benzyltrimethylammonium chloride
0.4 grams p-toluenesulfonic acid
1 liter perchloroethylene While stirring and keeping a nitrogen sparge, the mixture is heated to reflux for 7 hours during which time 17.8 ml of water is collected.

The two-phase mixture is then cooled and extracted three times with 600 ml of water. The combined water extracts are stripped on a rotary evaporator. Final removal of water and excess methacrylic acid is accomplished by vacuum distillation.

The product, a clear viscous liquid, is characterized by $^{13}C$ and $^{31}P$ nmr.

[$\delta$ $^{31}P$ = 21.8 ppm; $J_{PH}$ = 565 Hz]

Example 2

Copolymer Preparation

A polymer containing the following monomers is prepared:

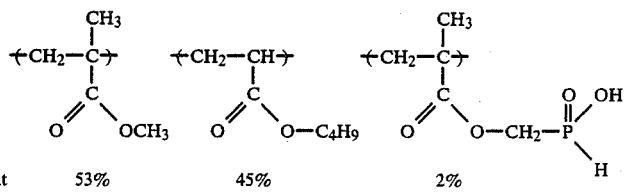

| | | |
|---|---|---|
| by weight | 53% | 45% | 2% |

In a 1-liter, round-bottom flask fitted with a mechanical stirrer is placed:
79.5 g methyl methacrylate
67.5 g butyl acrylate
3.0 g hydroxyphosphinylmethyl methacrylate
0.75 g benzoyl peroxide
700 mls methyl ethyl ketone The solution is refluxed for 3 hours. Methyl ethyl ketone (300 ml) is distilled off leaving a clear, highly viscous solution.

Example 3

Preparation of Latex

The following ingredients are mixed in a 1-liter beaker to prepare an emulsion:
400 ml water
48 g Triton X-200 (28% solids) (Trademark of Rohm and Haas, alkylaryl-ether sulfonate-anionic surfactant)
160 g methyl methacrylate (1.6 moles)
240 g ethyl acrylate (2.4 moles)
0.8 g ammonium persulfate 6.8 g 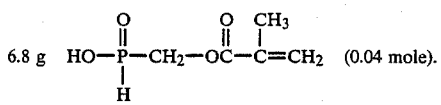 (0.04 mole).

In a reaction vessel consisting of a 2-liter, 3-necked, round-bottom flask fitted with a condenser, addition funnel, nitrogen inlet, thermometer and a mechanical stirrer is placed 100 ml of water and 100 ml of prepared emulsion. The flask is heated to 82° C. under a nitrogen blanket. The mixture begins to reflux and the temperature is raised to 90° C. When the reflux begins to slow, the remainder of the emulsion is added dropwise so that the pot temperature remains at 88° C. to 92° C. After the addition is finished, the temperature is raised to 97° C. for one hour. The emulsion is then cooled to room temperature and filtered through a paint strainer.

Example 4

Flash Rust Test

A latex is prepared by the procedure described in Example 3 from the following ingredients: 400 ml of water, 48 g of Triton X-200 (28 percent solids), 160 g of methyl methacrylate, 240 g of ethyl acrylate, 0.8 g of ammonium persulfate, and 4.0 g of methacrylic acid. This latex is not an example of the invention, and is included for comparative purposes.

On a cold rolled steel panel, coatings of the latex prepared in Example 3 and the comparative latex are placed on different parts of the panel. The coatings are allowed to air dry and are then heated at 150° C. for one hour.

The clear coatings obtained are scribed with an X, and a vial of water is turned over onto each X. After being left overnight, the portion of the panel coated with the comparative latex demonstrates a high degree of rusting, whereas the portion coated with the latex from Example 3 demonstrates little or no rusting.

The example demonstrates that a latex containing the monomers of this invention demonstrate enhanced corrosion prevention properties.

What is claimed is:

1. (Hydroxy)-phosphinylalkyl acrylate, (hydroxy)-phosphinylalkyl methacrylate, or an alkali metal, alkaline earth metal or ammonium salt thereof.

2. The compounds of claim 1 which correspond to the formula

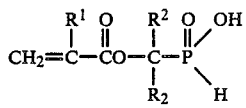

or

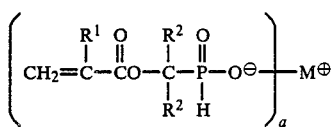

wherein:
$R^1$ is hydrogen or methyl;
$R^2$ is separately in each occurrence hydrogen or $C_{1-10}$ alkyl;
M is an alkali metal, alkaline earth metal or ammonium; and
a is 1 or 2.

3. The compound of claim 2 wherein $R^2$ is hydrogen or $C_{1-3}$ alkyl.

4. The compound of claim 3 wherein $R^2$ is hydrogen or methyl.

5. The compound of claim 4 wherein $R^2$ is hydrogen.

6. The compound of claim 3 wherein $R^1$ is methyl.

* * * * *